(12) United States Patent
Tsujimoto et al.

(10) Patent No.: US 11,329,543 B2
(45) Date of Patent: May 10, 2022

(54) DEVICE HAVING SWITCHING POWER SOURCE OPERABLE IN BURST SWITCHING CONTROL MODE

(71) Applicant: Brother Kogyo Kabushiki Kaisha, Nagoya (JP)

(72) Inventors: Yoshiyuki Tsujimoto, Nagoya (JP); Yuya Harada, Anjo (JP); Keisuke Manoh, Iwakura (JP); Masato Sueyasu, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/826,508

(22) Filed: Mar. 23, 2020

(65) Prior Publication Data

US 2020/0321877 A1 Oct. 8, 2020

(30) Foreign Application Priority Data

Mar. 28, 2019 (JP) .............................. JP2019-064866
Mar. 28, 2019 (JP) .............................. JP2019-064870

(51) Int. Cl.
*H02M 3/335* (2006.01)
*H02M 1/00* (2006.01)
(Continued)

(52) U.S. Cl.
CPC ........... *H02M 1/0035* (2021.05); *H02M 1/32* (2013.01); *H02M 3/33523* (2013.01); *H02M 1/08* (2013.01)

(58) Field of Classification Search
CPC .... H02M 1/0035; H02M 1/0032; H02M 1/32; G03G 15/5004; G03G 15/80
See application file for complete search history.

(56) References Cited

U.S. PATENT DOCUMENTS

2004/0042239 A1 3/2004 Kitano
2012/0113685 A1* 5/2012 Inukai ..................... G03G 15/80
363/21.01
(Continued)

FOREIGN PATENT DOCUMENTS

JP H06-350761 A 12/1994
JP 2000-050626 A 2/2000
(Continued)

*Primary Examiner* — Alex Torres-Rivera
(74) *Attorney, Agent, or Firm* — Burr & Brown, PLLC

(57) ABSTRACT

A device includes a driving portion, a transformer having a primary winding and a secondary winding, the secondary winding generating an output voltage, the driving portion being connected across the secondary winding so that the output voltage is applied to the driving portion, a switching element connected in series to the primary winding, a first controller provided in a primary side of the transformer for controlling the switching element, and a second controller supplied with the output voltage. The second controller is configured to perform, during implementation of a burst switching control, transmitting a stop signal to the first controller when the output voltage exceeds a first voltage, and transmitting, after transmission of the stop signal, a resumption signal to the first controller when the output voltage falls below a second voltage lower than the first voltage. The first controller controls the switching element to stop performing switching operations in response to the stop signal, and further controls the switching element to resume performing the switching operations in response to the resumption signal.

10 Claims, 9 Drawing Sheets

(51) Int. Cl.
*H02M 1/32* (2007.01)
*H02M 1/08* (2006.01)

(56) References Cited

U.S. PATENT DOCUMENTS

| | | | |
|---|---|---|---|
| 2012/0307530 A1* | 12/2012 | Miyazaki | H02M 1/36 |
| | | | 363/21.01 |
| 2014/0099139 A1 | 4/2014 | Kojima | |
| 2015/0028925 A1 | 1/2015 | Utani et al. | |
| 2020/0195154 A1* | 6/2020 | Mayell | H02M 3/3376 |

FOREIGN PATENT DOCUMENTS

| | | |
|---|---|---|
| JP | 2000-228873 A | 8/2000 |
| JP | 2004-088959 A | 3/2004 |
| JP | 2005-323412 A | 11/2005 |
| JP | 2014-079083 A | 5/2014 |
| JP | 2015-027184 A | 2/2015 |
| JP | 2016-197945 A | 11/2016 |

* cited by examiner

< PROCESS OF BURST SWITCHING CONTROL >

FIG. 7

| | P1 | P2 | P3 | P4 | P5 | P6 | P7 | ... | Pall |
|---|---|---|---|---|---|---|---|---|---|
| LAN PORT | DRIVE | | | | | | | ... | DRIVE |
| WLAN PORT | | DRIVE | | | DRIVE | | | ... | DRIVE |
| MODEM | | | DRIVE | | | DRIVE | DRIVE | ... | DRIVE |
| PANEL | | | | DRIVE | | | DRIVE | ... | DRIVE |
| COEFFI. | P1 | P2 | P3 | P4 | P5 | P6 | P7 | ... | Pall |

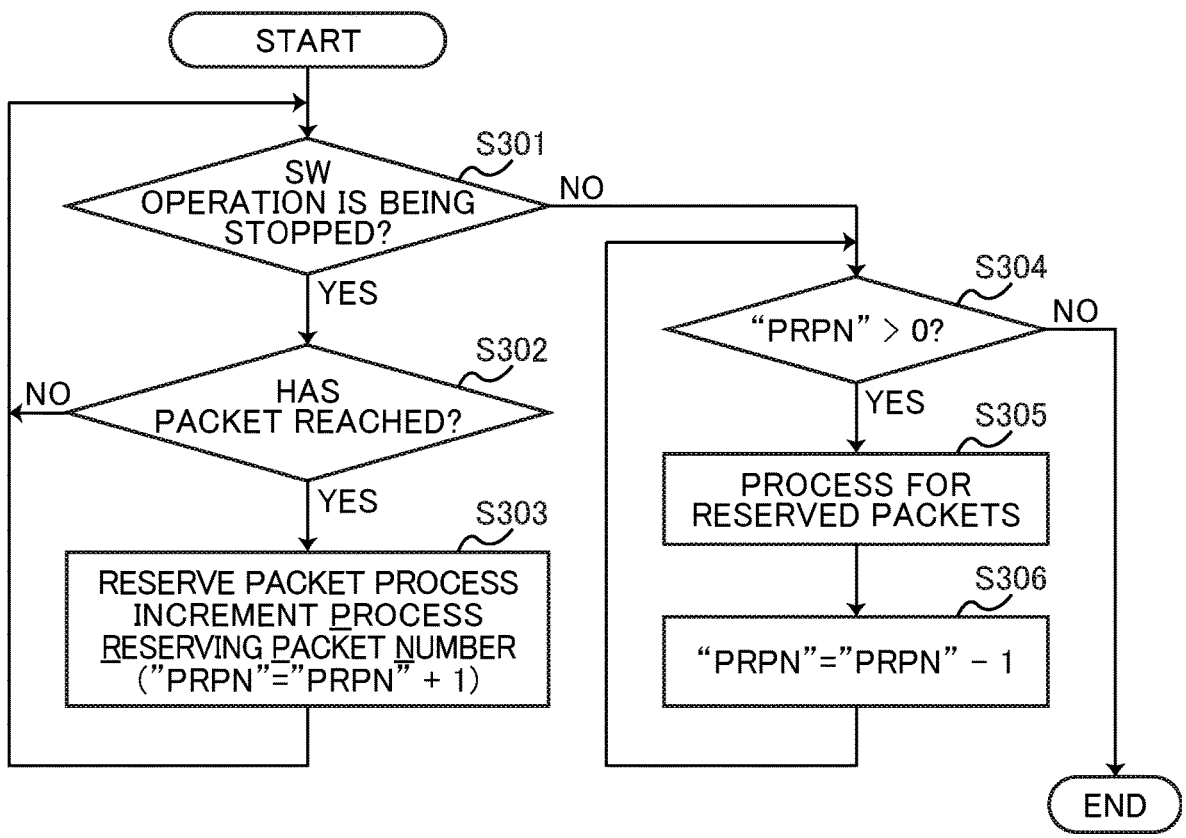

DEVICE HAVING SWITCHING POWER SOURCE OPERABLE IN BURST SWITCHING CONTROL MODE

CROSS REFERENCE TO RELATED APPLICATION

This application claims priority from Japanese Patent Application Nos. 2019-064866 and 2019-064870 both filed Mar. 28, 2019. The entire contents of the priority applications are incorporated herein by reference.

TECHNICAL FIELD

The present disclosure pertains to a device, such as an image forming device, having a switching power source operable in burst switching control mode.

BACKGROUND

A conventional switching power source device implements a burst switching control in which switching operation performed by a switching element is temporarily stopped and then resumed and such stoppage and resumption are repeatedly carried out.

The switching power source device disclosed in Japanese Patent Application Publication No. 2004-88959 includes a transformer having a primary winding to which a signal level determining circuit and a switching control circuit are connected, and a secondary winding having an output voltage detecting circuit. The switching power source device operates in such a manner that when main output voltage detected by the output voltage detecting circuit increases, operating power having been supplied to the switching control circuit is stopped by the signal level determining circuit, whereas when the output voltage detected by the output voltage detecting circuit decreases, supply of the operating power to the switching control circuit is resumed by the signal level determining circuit. With such a control, saving the consumption power has been achieved.

SUMMARY

The above-described conventional switching power supply device is involved with a problem that while the switching control circuit provided in the primary side of the transformer can be stopped, the signal level determining circuit provided in the primary side of the transformer cannot be stopped and thus the output voltage detecting circuit provided in the secondary side of the transformer cannot be stopped either.

An object of the present disclosure is to provide a device capable of stopping the detecting operation of the detection signal implemented by a primary-side controller and also the switching control of the switching element when the switching operation is temporarily stopped at the time of implementing the burst switching control.

In order to achieve the above and other objects, there is provided a device including a driving portion, a transformer having a primary winding and a secondary winding, the second winding generating an output voltage, the driving portion being connected across the secondary winding so that the output voltage is applied to the driving portion, a switching element connected in series to the primary winding and configured to perform switching operations, a first controller provided in a primary side of the transformer for controlling the switching element, and a second controller supplied with the output voltage. During implementation of a burst switching control, the second controller transmits a stop signal to the first controller when the output voltage exceeds a first voltage, and after transmission of the stop signal, transmits a resumption signal to the first controller when the output voltage falls below a second voltage lower than the first voltage. To this effect, the second controller includes a voltage detecting portion for detecting the voltage applied to the driving portion. The first controller controls the switching element to stop performing the switching operations in response to the stop signal, and further controls the switching element to resume performing the switching operations in response to the resumption signal.

With the above-described configuration, when the switching operations are temporarily stopped during implementation of the burst switching control, monitoring operation for monitoring detection signals generated from the voltage detecting portion and controlling operation for controlling the switching element can be interrupted.

BRIEF DESCRIPTION OF THE DRAWINGS

The particular features and advantages of the invention as well as other objects will become apparent from the following description taken in connection with the accompanying drawings, in which:

FIG. 7 is one example of a table for determining a first coefficient in the load coefficient setting process;

FIG. 9 is a flowchart illustrating a packet process holding process in accordance with a third embodiment.

DETAILED DESCRIPTION

First Embodiment

Figure 1:
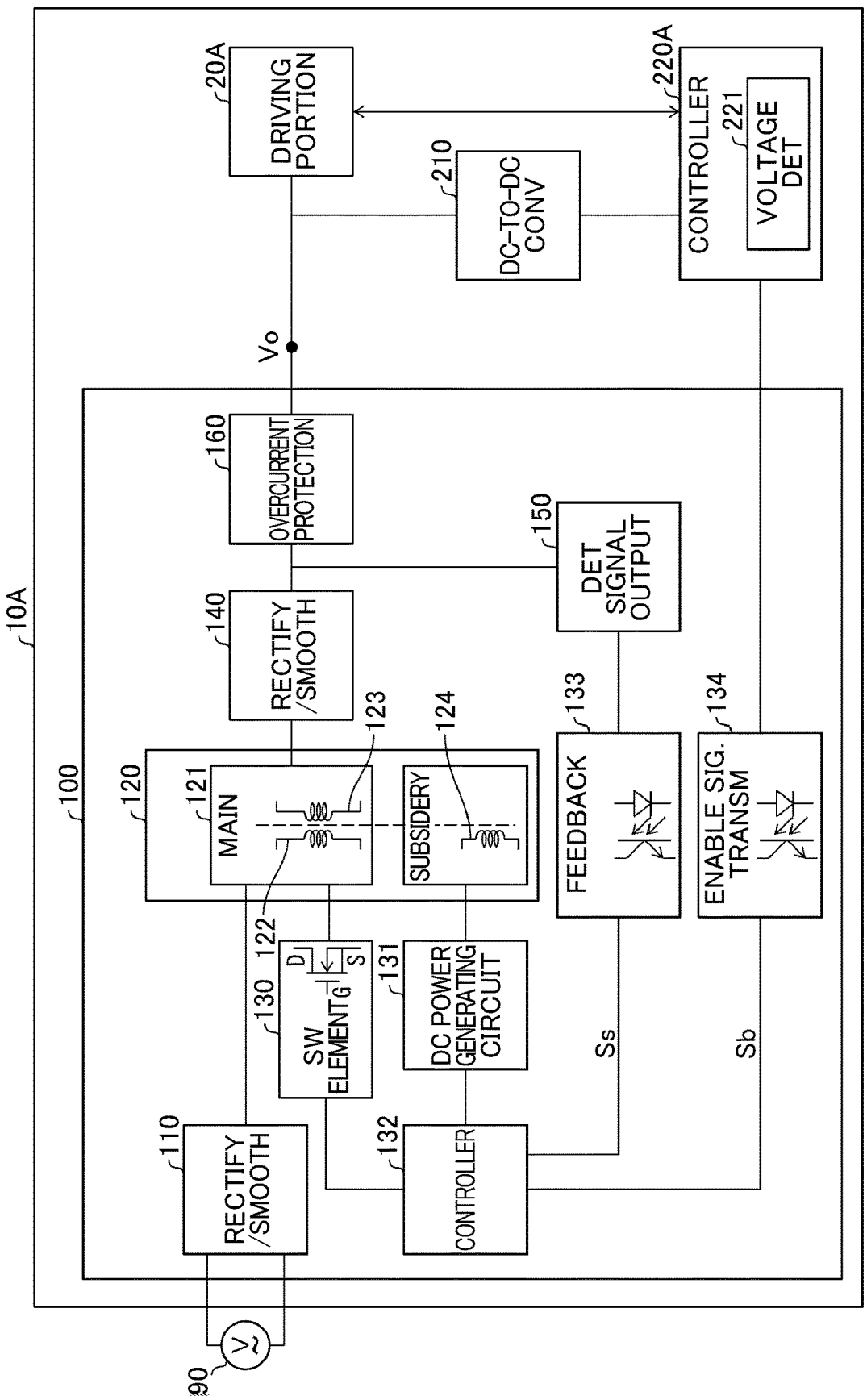
FIG. 1 is a block diagram illustrating an arrangement of the device in accordance with a first embodiment.
Figure 2:
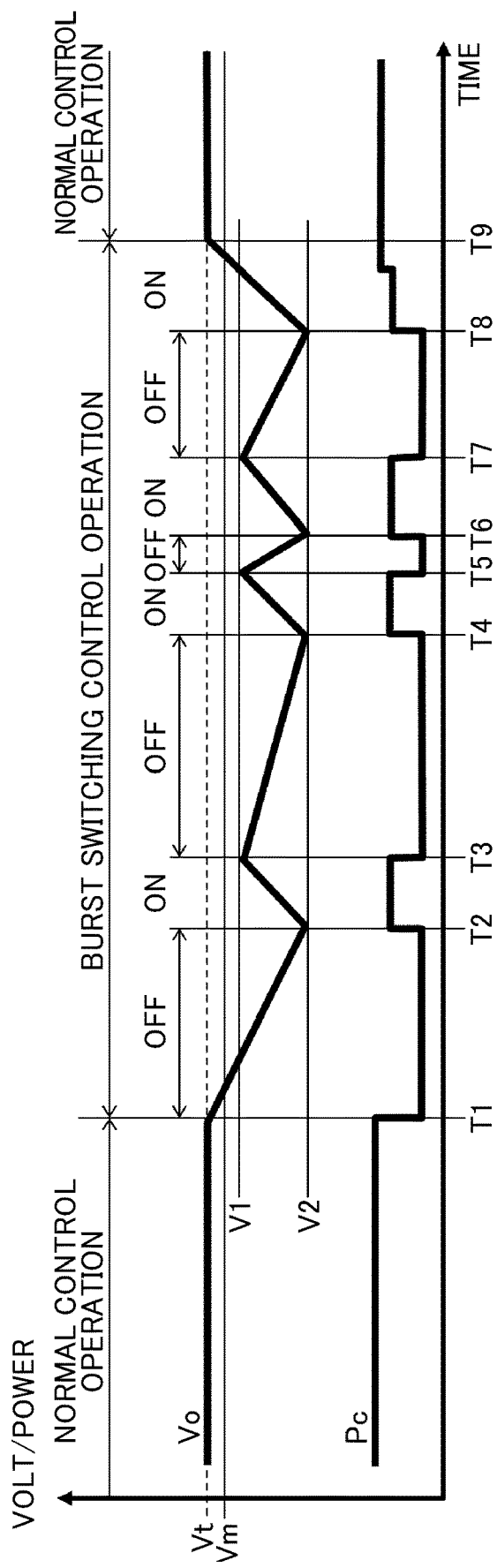
FIG. 2 is a timing chart illustrating operations of the device in accordance with the first embodiment.

Referring to FIGS. 1 and 2, a first embodiment will be described in detail.

<Overall arrangement of the Device>

FIG. 1 is a block diagram illustrating an arrangement in accordance with the first embodiment. A device 10A includes a low voltage power source 100, a driving portion 20A powered by the low voltage power source 100, and a controller 220A. The controller 220A is powered by the low voltage power source 100 and controls the driving portion 20A. The device 10A includes a flyback switching power source and is operative when supplied with AC power from an external AC power source 90. An image forming portion is one example of the driving portion 20A, in which case the device 10A is an image forming apparatus. The device 10A is not limited to the image forming apparatus but is applicable to any other apparatuses.

<Arrangement of Low Voltage Power Source>

The low voltage power source 100 includes a primary-side rectifying/smoothing circuit 110, a transformer 120, a switching element 130, a primary-side DC power generating circuit 131, a primary-side controller primary-side controller 132, a feedback circuit 133, an enable signal transmitting circuit 134, a secondary-side rectifying/smoothing circuit 140, a detection signal output portion detection signal outputting portion 150, and an over-current protection circuit 160.

The transformer 120 has a main winding 121 and a subsidiary winding 124. The main winding 121 is made up of a primary winding 122 and a secondary winding 123. The primary-side rectifying/smoothing circuit 110 is configured to rectify and smooth power supplied from the external AC power source 90 and output voltage having a near DC waveform. The output of the primary-side rectifying/smoothing circuit 110 is applied to the primary winding 122.

The switching element 130 is connected in series to the primary winding 122 of the transformer 120. When the switching element 130 is rendered ON or conductive, the current from the primary-side rectifying/smoothing circuit 110 flows in the primary winding 122. No current flows in the primary winding 122 when the switching element 130 is rendered OFF or non-conductive. The switching element 130 is a semiconductor element operable with voltage applied thereto. One example of such a switching element is a MOS-FET (Metal-Oxide Semiconductor Field Effect Transistor) having a gate to which voltage is applied. ON/OFF switching operation of the MOS-FET are performed depending on the gate voltage.

The primary-side DC power generating circuit 131 is connected to the subsidiary winding 124 of the transformer 120 and configured to output DC power. A primary-side DC power generating circuit 131 is provided in the primary side of the transformer 120. In accordance with the switching operation performed by the switching element 130, AC power is generated in the subsidiary winding 124. The primary-side DC power generating circuit 131 smooths the AC power thus generated to be near DC voltage waveform, and supplies DC power to the primary-side controller 132. The primary-side controller 132 is operable when the driving voltage is applied thereto from the primary side of the transformer 120. The primary-side DC power generating circuit 131 includes elements capable of temporarily storing energy, such as capacitor or inductor. As such, power is continuously supplied to the primary-side DC power generating circuit 131 for a certain period of time after stoppage of the switching operation.

The primary-side controller 132 is provided for controlling the switching element 130. The primary-side controller 132 applies pulsating voltage of a prescribed frequency and duty ratio to the gate of the switching element 130 to thereby implement the switching control in the device 10A.

A secondary-side rectifying/smoothing circuit 140 is connected to the secondary winding 123 of the transformer 120. In accordance with the switching operation of the switching element 130, AC power is generated in a secondary winding 123. The secondary-side rectifying/smoothing circuit 140 smooths the thus generated AC power to a near DC voltage waveform and outputs the same to the over-current protection circuit 160. The secondary-side rectifying/smoothing circuit 140 includes elements capable of temporarily storing energy, such as capacitor or inductor. While the output voltage Vo from the low voltage power source 100 is gradually lowered when the switching operation are stopped, the power supplied from the secondary-side rectifying/smoothing circuit 140 is substantially maintained for a certain period of time even after the stoppage of the switching operation.

A detection signal outputting portion 150 is provided for detecting the output voltage from the secondary-side rectifying/smoothing circuit 140, which voltage is the same as the output voltage Vo from the device 10A. The device 10A is operated so that the output voltage therefrom is brought to a target voltage Vt (predetermined value) during a normal control operation. To this effect, the detection signal outputting portion 150 monitors the output voltage Vo and feeds back a detection signal Ss to the primary-side controller 132. The detection signal Ss indicates whether the output voltage Vo is above the target voltage Vt.

The primary-side controller 132 internally includes a pulsating voltage generation circuit and a monitoring circuit for monitoring receipt of the detection signal Ss. In response to the detection signal Ss, the primary-side controller 132 controls the frequency and duty ratio of the pulsating voltage during a normal control operation, and implements the switching control so that the output voltage Vo is brought to the target voltage Vt. Such a normal control operation is the same as the normal operation conventionally implemented in the switching power source.

The feedback circuit 133 includes a photocoupler coupled between the detection signal outputting portion 150 provided in the secondary side of the driving portion 20A and the primary-side controller 132 provided in the primary side of the transformer 120. The feedback circuit 133 preserves electrical insulation between the primary side and the secondary side of the transformer 120 and feeds back the detection signal Ss to the primary-side controller 132.

The photocoupler includes, for example, a light emitting diode and a phototransistor (bi-polar transistor) as shown in FIG. 1. When the photocoupler feeds back the detection signal Ss to the primary-side controller 132, whether the output voltage Vo is small or larger than the target voltage Vt can be transmitted to the primary side of the transformer 120 relying on the light emitting strength in the light emitting diode. Transmission of the detection signal Ss in this way is similar to what is disclosed in Japanese Patent Application Publication No. 2004-88959 mentioned previously. It is preferable that the feedback circuit 133 be configured to indicate whether the output voltage Vo is smaller or larger than the target voltage Vt by lighting or lighting out the light emitting diode.

Regardless of the fact that the output voltage Vo is larger than or smaller than or equal to the target voltage Vt, the light emitting diode generally emits light. However, the light emitting diode does not emit light when the output voltage Vo falls below a threshold voltage in a diode characteristic. In this case, substantially no current flows in the light emitting diode, so that power consumption in a circuit for flowing current to the light emitting diode and the phototransistor is suppressed. As will be described later, in the burst switching control operation which is implemented under a condition that the output voltage Vo falls below the target voltage Vt, the light emitting diode is not lit, thereby suppressing the power consumption as well.

The enable signal transmitting circuit 134 is connected between the controller 220A and primary-side controller 132 while preserving electrical insulation. The controller 220A is provided in the side of the secondary winding of the transformer 120 and the primary-side controller 132 is provided in the side of the primary winding of the transformer 120. The enable signal transmitting circuit 134 transmits an enable signal Sb from the controller 220A to the primary-side controller 132 through the enable signal transmitting circuit 134. The enable signal transmitting circuit 134 includes a photocoupler made up of a light emitting element and a phototransistor.

The over-current protection circuit 160 is connected to the secondary-side rectifying/smoothing circuit 140. The over-current protection circuit 160 monitors the output from the low voltage power source 100 and configured to prevent an overcurrent from flowing in the driving portion 20A. The over-current protection circuit 160 is provided for bypassing the output from the low voltage power source 100 in order to prevent an over-current from flowing in the driving portion 20A. The over-current protection circuit 160 effectively operates when an overcurrent flows out the low voltage power source 100. The over-current protection circuit 160 achieves such an overcurrent prevention function by consuming a part of power supplied from the secondary-side rectifying/smoothing circuit 140.

In the following description, the output from the secondary-side rectifying/smoothing circuit 140 and the output voltage Vo will be treated as being the same, because the input-side and output-side voltages of the over-current protection circuit 160 are substantially the same.

<Structure of Driver>

The driving portion 20A is supplied with DC power as an output power from the low voltage power source 100. The driving portion 20A is supplied with the output power from the secondary winding 123 of the transformer 120.

In one embodiment, the driving portion 20A is an image forming apparatus which is configured to operate with the DC voltage supplied from the low voltage power source 100. The driving portion 20A operating as the image forming apparatus is of an electro-photographic type in which toner images are formed on a sheet. Such an image forming apparatus typically includes a processor, a thermal fixing device, and a sheet conveying mechanism.

<Structure of DC-to-DC Converter>

In addition to the low voltage power source 100 and driving portion 20A, the device 10A further includes a DC-to-DC converter circuit 210. The DC-to-DC converter circuit 210 is branched out from the power line connected between the low voltage power source 100 and the driving portion 20A and provided for supplying DC power to the controller 220A. The controller 220A is brought to an operable condition when supplied with the DC power. When the image forming apparatus as an example of the driving portion 20A is carrying out the image forming operation, the output voltage Vo from the low voltage power source 100 is on the order of 6 volts, which voltage is relatively high in comparison with the various voltages applied to various parts of the image forming apparatus. The voltage supplied to the controller 220A is on the order of 3.3 volts, which voltage is relatively low. The DC-to-DC converter circuit 210 converts the DC voltage supplied from the low voltage power source 100 to a different DC voltage and the resultant DC voltage is applied to the controller 220A.

<Arrangement of Controller>

The controller 220A includes a counter 223 for indirectly detecting the output voltage Vo while monitoring the voltage supplied to the controller 220A. The controller 220A is configured from an ASIC (Application Specific Integrated Circuit) and includes a CPU (Central Processing Unit), a RAM (Random Access Memory) (not shown), and a ROM (Read-Only Memory) (not shown). The ROM stores various control programs for controlling the image forming portion as the driving portion 20A, various settings, initial values, and the like). The RAM is used as an working area into which the various control programs stored in the ROM are read, and also as a storage area for temporarily storing image data. In accordance with the programs stored in the RAM, the controller 220A controls the image forming portion as an example of the driving portion 20A.

When the controller 220A controls the driving portion 20A under a normal control mode, the voltage detecting portion 221 is not rendered operative. In a power saving mode in which the driving portion 20A is not rendered operative, the voltage detecting portion 221 is rendered operative. At the time of performing the burst switching control operation in the power saving mode, the voltage detecting portion 221 is rendered operative. The voltage detecting portion 221 generates an enable signal Sb based on the detection results and transmits the same to the primary-side controller 132.

<Conspicuous Operation of Device>

The device 10A in accordance with the first embodiment carries out conspicuous operation at a time of burst switching control operation.

Upon receipt of the enable signal Sb in the form of a stop signal from the controller 220A, the primary-side controller 132 stops generation of the pulsating voltage and thus stops the switching operation. Stoppage of the switching operation interrupts or decreases power supply to a pulsating voltage generation circuit and/or a monitoring circuit for monitoring the detection signal Ss which circuits are provided within the primary-side controller 132, thereby lowering the consumption power. An enable signal monitoring circuit which is a part of the primary-side controller 132 is kept operating even during the stoppage of the switching operation. To this effect, power supply needed for keeping the operation of the enable signal monitoring circuit is maintained. When the primary-side controller 132 receives the enable signal Sb in the form of a resumption signal from the controller 220A, power supply to the pulsating voltage generation circuit and the monitoring circuit of the detection signal Ss is resumed, causing the switching operation to resume.

The controller 220A outputs the stop signal as the enable signal Sb at the start of the burst switching operation. During the burst switching control operation, the controller 220A operates the voltage detecting portion 221. The controller 220A outputs the stop signal as the enable signal Sb to the primary-side controller 132 when the voltage detecting portion 221 detects that the output voltage Vo exceeds a first predetermined voltage V1, whereas the controller 220A outputs the resumption signal as the enable signal Sb to the primary-side controller 132 when the voltage detecting portion 221 detects that the output voltage Vo falls below a second predetermined voltage V2. The second predetermined voltage V2 is lower than the first predetermined voltage V1. Other than the time at which the stop signal or the resumption signal is outputted, the enable signal Sb takes non-signal form.

FIG. 2 is a timing chart for explanation of the operation of the device 10A. FIG. 2 illustrates changes of the output voltage Vo and the consumption power Pc during a period of time at which the device 10A is shifted from the normal control operation to the burst switching control operation, and thereafter the latter operation returns to the former operation. The consumption power Pc indicates electric power consumed inside the low voltage power source 100. FIG. 2 shows the outline of the shift of the consumption power.

As described above, in the normal control operation, the primary-side controller 132 initially implements switching control of the switching element 130 based on the feedback signal of the output voltage Vo outputted from the detection signal outputting portion 150. Hence, the output voltage Vo is maintained at the target voltage Vt.

At time instant T1 when the burst switching control operation starts, the controller 220A outputs the enable signal Sb in the form of the stop signal to the primary-side controller 132. Then, the primary-side controller 132 stops the switching control and the switching element 130 is rendered OFF. As a result, the output voltage Vo is gradually lowered. At this time, power supply to the pulsating voltage generation circuit and the monitoring circuit of the detection signal Ss provided within the primary-side controller 132 are interrupted or decreased, causing the consumption power Pc in the low voltage power source 100 to decrease.

The voltage detecting portion 221 detects at time instant T2 that the output voltage Vo has fallen below the second voltage V2 after having been continuous lowered. The controller 220A outputs the enable signal in the form of the resumption signal to the primary-side controller 132. Then, power supply is resumed supplying power to the pulsating voltage generation circuit and the monitoring circuit of the detection signal Ss within the primary-side controller 132. Due to the resumption of the power supply, power consumption in the low voltage power source 100 increases. Also, the primary-side controller 132 resumes the switching operation of the switching element 130, with the result that the output voltage Vo gradually increases.

The voltage detecting portion 221 detects at time instant T3 that the output voltage Vo has exceeded the first voltage V1 after having continuously increased. The controller 220A outputs the enable signal Sb in the form of the stop signal to the primary-side controller 132. In response to the stop signal, the primary-side controller 132 stops the switching operation, resulting in rendering the switching element 130 OFF and gradually lowering the output voltage Vo. At this time, interrupted or decreased is power supply to the pulsating voltage generation circuit and the monitoring circuit of the detection signal Ss within the primary-side controller 132. Consequently, the consumption power Pc in the low voltage power source 100 is lowered.

Thereafter, repeatedly carried out are resumption of the switching operation at time instants T4, T6, and T8 and stoppage of the switching operation at time instants T5 and T7.

It should be noted that FIG. 2 additionally shows the operation lower limit voltage Vm in the detection signal outputting portion 150. The operation lower limit voltage Vm is smaller than the target voltage Vt and the first voltage V1 is set to be a value smaller than the operation lower limit voltage Vm.

The operation lower limit voltage Vm is such a value that does not emit the light emitting diode. When the voltage applied to the light emitting diode is lower than the threshold value, current hardly flows in the light emitting diode. In connection with such a phenomenon, if the output voltage Vo has reached the operation lower limit voltage Vm, power consumption in the detection signal outputting portion 150 and the feedback circuit 133 becomes extremely lowered. Because the burst switching operation is implemented under the condition that the output voltage Vo does not exceed the first voltage V1, there is no substantial power consumption in the detection signal outputting portion 150 and the feedback circuit 133 during the burst switching control operation.

When implementation of the bursts switching control operation is released at time instant T8 afterward, the output voltage Vo increases to a level exceeding the first voltage V1 and further exceeding the operation lower limit voltage Vm. Then, feedback of the output voltage Vo to the primary-side controller 132 by virtue of the detection signal outputting portion 150 is resumed, so that the burst switching control operation is changed to the normal control operation in which the output voltage is maintained at the target voltage Vt.

<Operational Effects>

As described above, in the device 10A, power supply to the circuits in the primary-side controller 132 needed to operate during the switching control is either interrupted or decreased. Hence, power consumption in the primary-side controller 132 is remarkably reduced during stoppage of the switching operation. Further, in the device 10A, power is little consumed in the detection signal outputting portion 150 and the feedback circuit 133 during the burst switching control operation.

In the prior art described in Japanese Patent Application Publication No. 2004-88959, a voltage detection circuit, which corresponds to the detection signal outputting portion 150 in the above-described embodiment, needs to continuously operate even during the burst switching control operation. In this connection, it is also necessary for a signal level determination circuit of the prior art which corresponds to the monitoring circuit of the detection signal Ss in the primary-side controller 132 of the above-described embodiment, and a feedback circuit of the prior art which corresponds to the feedback circuit of the above-described embodiment to continuously operate. In the above-described embodiment, there is no need to operate the detection signal outputting portion 150, primary-side controller 132, and feedback circuit 133 on the device 10A. In comparison of the above-mentioned prior art, consumption power during the burst switching control operation can effectively be suppressed.

On the other hand, in the device 10A, it is required that the secondary-side controller 220A be operated during the burst switching control operation. The controller 220A is configured from an IC manufactured using a fine processing technology, such as ASIC, microprocessor, CPU, which are capable of operating with low power consumption. As such, increase of power consumption is only a little for operating the controller 220A for the purpose of monitoring the output voltage Vo during the burst switching control operation.

The enable signal Sb, which is used for feeding back information about the output voltage Vo to the primary side during the burst switching operation, is produced only when the changeover timings of the switching control operation. The enable signal Sb is in a non-signal form over a major part of the operation time period, so that power is little consumed for transmitting the enable signal Sb. In addition, power is also little consumed in the enable signal transmitting circuit 134.

In the device 10A, the detection signal outputting portion 150 and the voltage detecting portion 221 are configured to be separate one from the other. The detection signal outputting portion 150 is provided for detecting the output voltage Vo at the time of normal control operation. The voltage detecting portion 221 is provided for detecting the output voltage Vo at the time of burst switching control operation. Separation of the two parts enables the levels of the first voltage V1 and the second voltage V2 to be set independently of the circuit configuration of the detection signal outputting portion 150. Note that depending on the levels of the first voltage V1 and the second voltage V2, determination is made with respect to the stoppage and resumption of the switching operation during the switching control operation implemented under the burst switching control operation. Hence, the second voltage V2 for resuming the switching operation can be greatly lowered from the target voltage Vt and thus the period of time during which the switching operation is being stopped can be prolonged, thereby further decreasing the power consumption during the burst switching control operation.

In the device 10A, it is desirable that the first voltage V1 be set to a value lower than the operation lower limit voltage of the over-current protection circuit 160. By so setting the first voltage V1, the over-current protection circuit 160 is not allowed to operate during the burst switching control operation, so that the power consumption in the over-current protection circuit 160 is zeroed. Because the burst switching control operation is implemented under a lower load condition, there is no need for monitoring the over-current. With the configuration described above, the power consumption during the burst switching control operation can further be decreased.

Second Embodiment

Next, a second embodiment will be described while referring to FIGS. 3 to 9. For the sake of simplicity, like circuits or portions appearing in the second embodiment will be denoted by like reference numerals used in the description of the first embodiment and duplicate description thereof will be omitted.

Figure 3:
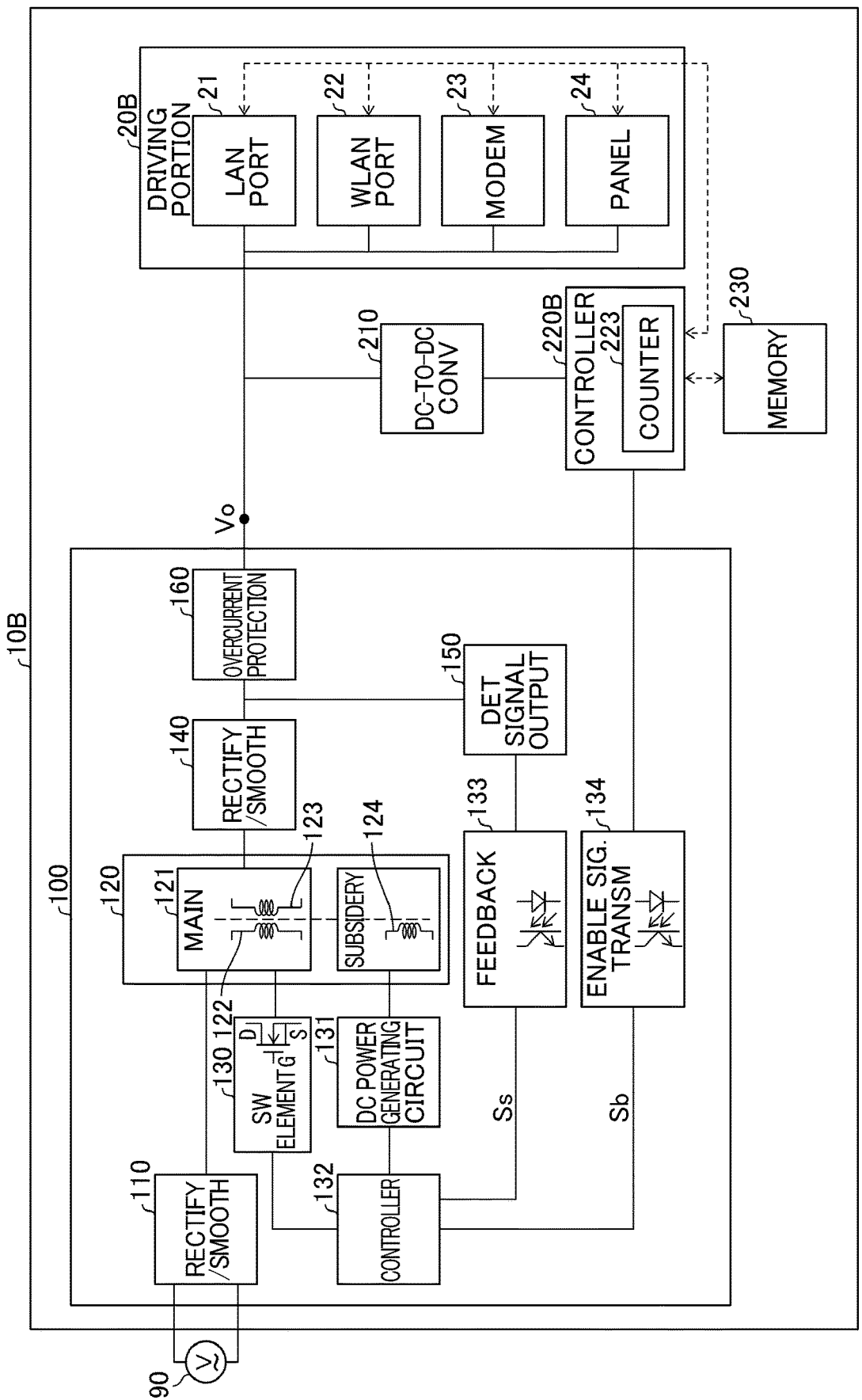
FIG. 3 is a block diagram illustrating an arrangement of the device in accordance with a second embodiment.

FIG. 3 is a block diagram in accordance with the second embodiment. In the second embodiment, the device is denoted by reference numeral 10B, the driving portion by reference numeral 20B, and the controller by reference numeral 220B so as to be in contrast with the device 10A, driving portion 20A, controller 220A appearing in the first embodiment. The arrangement and function of the low voltage power source 100 in in FIG. 3 are identical to those in FIG. 1, so the duplicating description thereof is not repeated hereinafter.

The device 10B includes a driving portion 20B, a DC-to-DC converter circuit 210, a controller 220B, and a memory 230 other than the low voltage power source 100. The driving portion 20B is connected to the output of the low voltage power source 100 and supplied with DC power as an output power from the low voltage power source 100. In other words, the secondary winding 123 of the transformer 120 supplies the output voltage to the driving portion 20B. The device 10B is supplied with DC power from the low voltage power source 100 so as to be capable of implementing prescribed functions and includes various driving measures.

The driving portion 20B is provided with a LAN (Local Area Network) port 21, a WLAN (Wireless Local Area Network) port 22, a MODEM (Modulator/Demodulator) 23, and a panel 24. The LAN port 21 is a communication interface for communicating with an external device through a LAN. The LAN port 21 is also a communication network for wirelessly connecting to the LAN and communicating an external device. The LAN port 21 is an example of a communication section. The MODEM 23 is a communication interface for implementing a facsimile function and also communicating with an external device through a telephone line. The panel 24 is a module for displaying information. Those driving measures such as shown in FIG. 3 are merely examples for the sake of further description of the second embodiment and the arrangements of the 20b are not limited thereto.

The DC-to-DC converter circuit 210 is branched out from the power line connected between the low voltage power source 100 and the driving portion 20B and provided for supplying DC power to the controller 220B. The controller 220B operates Vo when the output power is supplied from the secondary winding 123. The output voltage Vo from the low voltage power source 100 is on the order of 6 volt, which voltage is relatively high. The voltage supplied to the controller 220A is on the order of 3.3 volts, which voltage is relatively low. The DC-to-DC converter circuit 210 converts the DC voltage supplied from the low voltage power source 100 to a different DC voltage and the resultant DC voltage is applied to the controller 220B.

The controller 220B is provided with a counter 223 for measuring a period of time by counting clock signals constantly generated at every prescribed interval. The controller 220B is configured from an ASIC and includes a CPU, a RAM, and a ROM. The ROM stores various control programs for controlling the driving portion 20B, various settings, initial values, and the like. The RAM is used as a working area into which the control programs stored in the ROM are read, and also as a storage area for temporarily storing image data, for example.

The controller 220B estimates the level of the output voltage Vo at the power saving mode or at the time of burst switching control operation and generates an enable signal Sb based on the estimated output voltage Vo. The enable signal Sb is feedback to the primary-side controller 132 via the enable signal transmitting circuit 134.

A memory 230 is capable of storing, retaining information and retrieving the stored information.

Operation of the device 10B in accordance with the second embodiment will be described while referring to the flowchart shown in FIG. 4. The device 10B repeatedly executes S1 through S5.

Initially, the device 10B starts the normal control operation (S1). Thereafter, the controller 220B detects its power consumption and determines whether the device 10B satisfies conditions of the power saving mode (S2). If the determination made in S2 is "YES", the routine proceeds to S3. Otherwise (S2: NO), processing in S2 is repeatedly executed until determination made in S2 turns to "YES".

When the determination made in S2 is "YES", the device 10B ends the normal control operation (S3), and starts implementation of the burst switching control operation (S4). During the burst switching control operation, the controller 220B detects consumption power in the driving portion 20B (S5) and determines whether the device 10B satisfies conditions of releasing the power saving mode (S5). If the determination made in S5 is "YES", the routine proceeds to S6. Otherwise (S5: NO), processing in S5 is repeatedly executed until determination made in S5 turns to "YES". When the determination made in S5 is "YES", the device 10B ends the burst switching control operation (S6), whereupon the routine ends.

The device 10B in accordance with the second embodiment carries out conspicuous operation at a time of burst switching control operation, which will be described hereinafter while referring to FIGS. 3 to 6.

Upon receipt of the enable signal Sb in the form of a stop signal from the controller 220A, the primary-side controller 132 stops generation of the pulsating voltage and thus stops the switching operation. Stoppage of the switching operation interrupts or decreases power supply to a pulsating voltage generation circuit and/or a monitoring circuit for monitoring the detection signal Ss which circuits are provided within the primary-side controller 132, thereby lowering the consumption power. An enable signal monitoring circuit which is a part of the primary-side controller 132 is kept operating even during the stoppage of the switching operation. To this effect, power supply needed for keeping the operation of the enable signal monitoring circuit is maintained. The low voltage power source 100 is configured so that the voltage supplied to the primary-side controller 132 from the primary-side DC power generating circuit 131 does not fall below the voltage needed for operating the monitoring circuit for monitoring the enable signal Sb. It is desirable that the primary-side controller 132 be operable with the power needed only for receiving the resumption signal.

When the primary-side controller 132 receives the enable signal Sb in the form of the resumption signal from the controller 220B, power supply is resumed for the internal pulsation voltage generation circuit and the detection signal (Ss) monitoring circuit, thereby resuming the switching operation. Delay yields at the time of resuming the switching operation from the time the resumption signal is received at the primary-side controller 132. The switching operation starts in response to the pulsating voltage applied to the gate of the switching element 130. The period of time from receipt of the resumption signal at the primary-side controller 132 to the resumption of the switching operation will be referred to as the delay time D.

Figure 4:
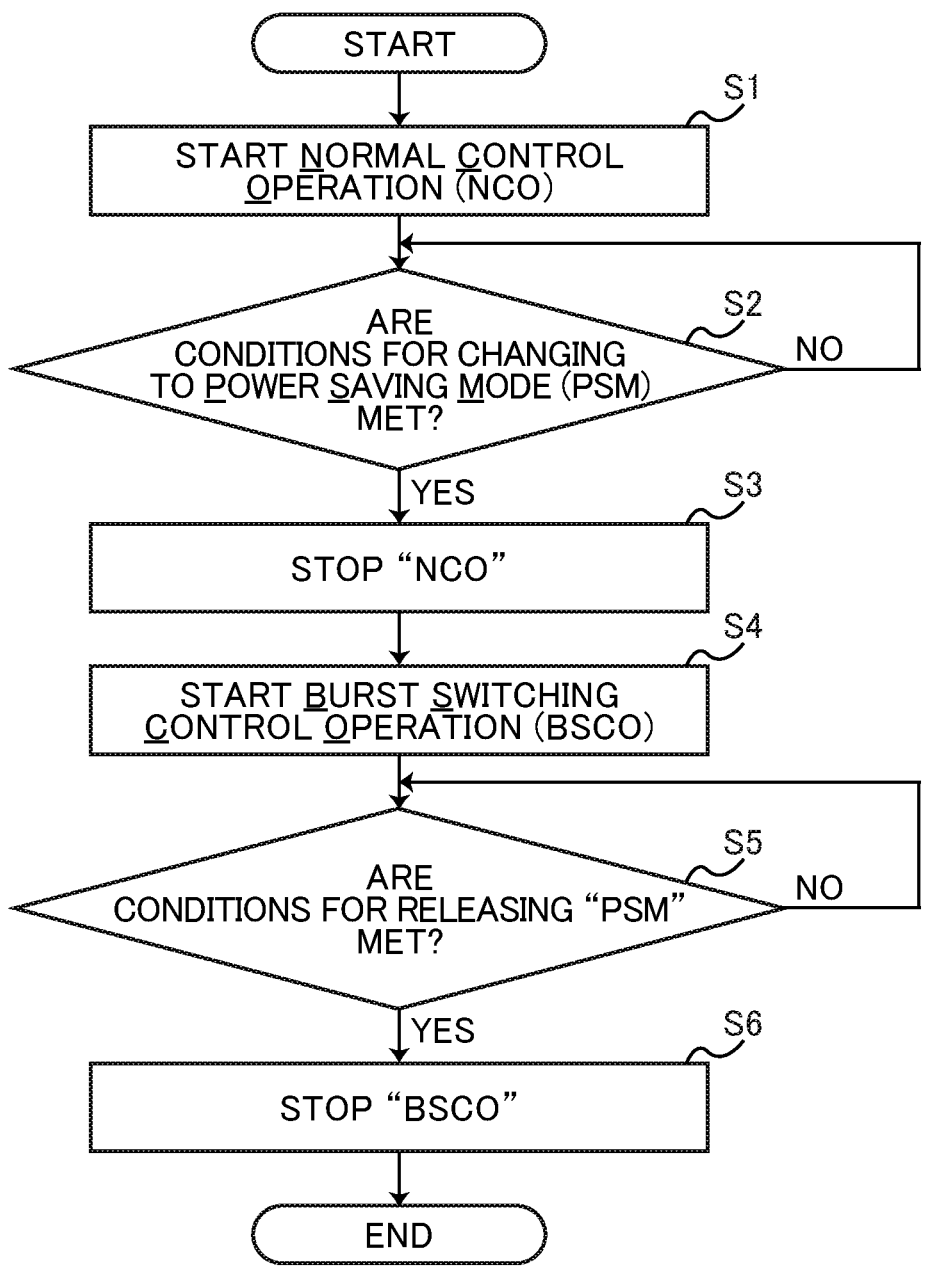
FIG. 4 is a flowchart illustrating operations of the device in accordance with the second embodiment.

When the device 10B starts the operation of the burst switching control in S4 of the flowchart in FIG. 4, the process of the burst switching control is implemented. When the device 10B stops the operation of the burst switching control in S6 of the flowchart in FIG. 4, implementation of the process of the burst switching control is interrupted.

In the burst switching control operation, the stoppage and resumption of the switching operation are repeatedly carried out so that the output voltage Vo can change between the lower limit voltage V1 and the upper limit voltage V2. The lower limit voltage V1 is the minimum output voltage Vo that allows the various parts including the controller 220B to be operable with the power supplied from the low voltage power source 100. The lower limit voltage V1 is set to a value higher than the operation lower limit voltage. The upper limit voltage V2 is a target voltage of the output voltage Vo at the time of normal control operation. The upper limit voltage V2 is set to a value lower than the target voltage Vt.

Figure 5:
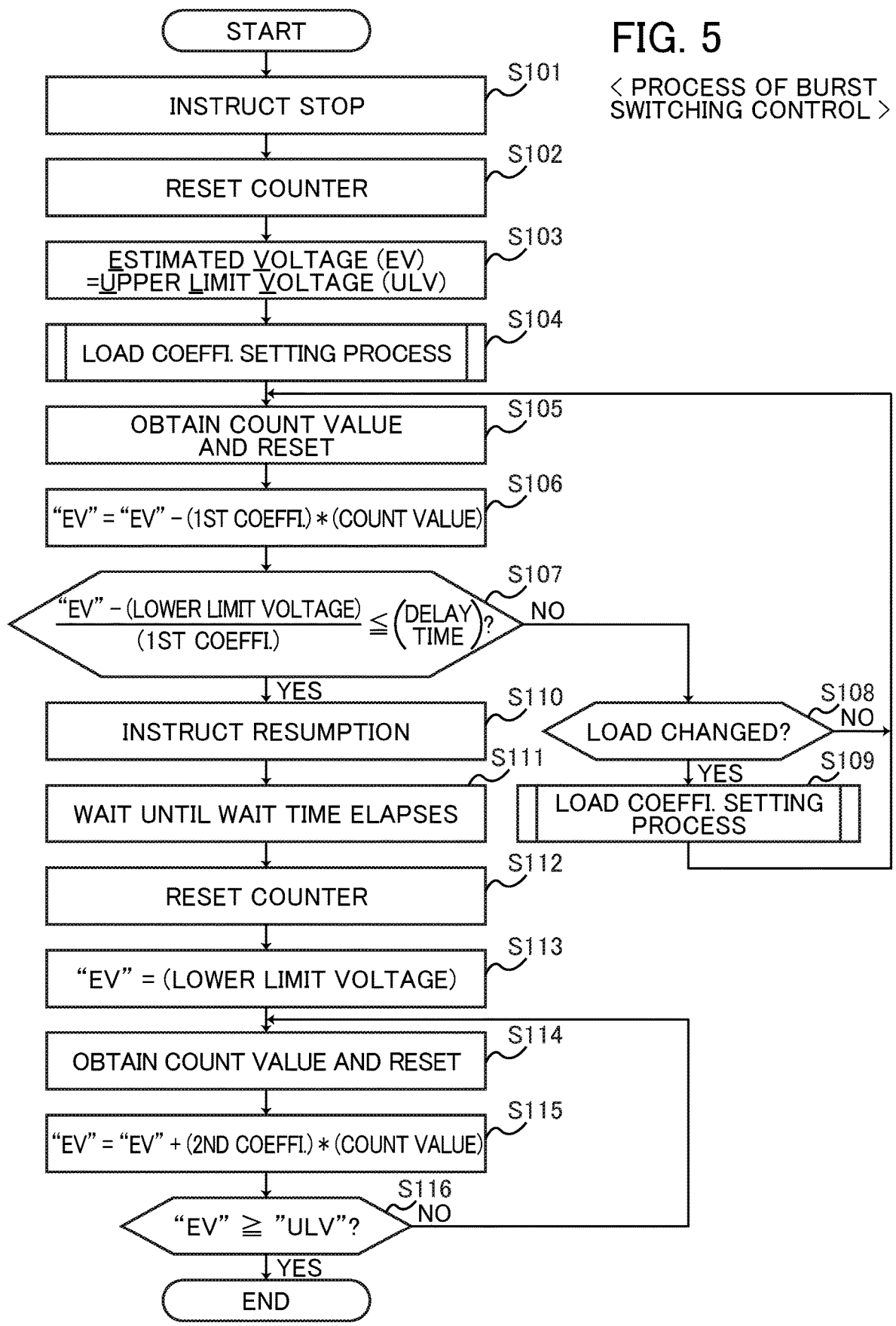
FIG. 5 is a flowchart illustrating a burst switching control process in accordance with the second embodiment.

FIG. 5 is a flowchart illustrating the burst switching control process. In the burst switching control process, the controller 220B estimates the output voltage Vo. The output voltage estimated by the controller 220B will be referred to as "estimated voltage Ve". The device 10B repeatedly carries out the processes from S101 to S116 until the burst switching control is interrupted.

In S101, the controller 220B outputs a stop signal to the primary-side controller 132 in order to instruct the same to stop the switching operation. In S102, the controller 220B resets the counter 223 for counting the clock signals. Specifically, the count value C of the counter 223 is set to zero. In S103, the controller 220B estimates the upper limit voltage V2. The estimated voltage is represented by Ve. In S104, the controller 220B implements a load coefficient setting process which will be described later.

In S105, the controller 220B acquires the count value in the counter 223, and then resets the counter 223. The count value C represents a period of time from the time at which the counter is reset to the present time. In S106, the controller 220B updates the estimated voltage Ve by subtracting a product of the first coefficient K1 and the count value C from the pre-estimated voltage Ve, i.e., Ve−K1*C.

The first coefficient K1 represents a lowering gradient of the output voltage Vo estimated by the controller 220B at the time of stoppage of the switching operation. The first coefficient K1 is equivalent to the lowered voltage of the estimated voltage Ve per unit time (clock interval). How to calculate the first coefficient K1 will be described later. In S107, the controller 220B determines whether the voltage calculated by dividing the voltage obtained by subtracting the lower limit voltage V1 from the estimated voltage Ve with the first coefficient K1 is equal to or below the delay time D. More specifically, the controller 220B determines whether the relation of (Ve−V1)/K1<=D is met. The value of (Ve−V1)/K1) is defined on the basis of the first coefficient K1 and represents a period of time from the present time to the estimated time (first time) at which the output voltage Vo reaches the lower limit voltage V1. When it is determined that the above inequality relation is met (S107: YES), the routine proceeds to S110. Otherwise, the routine proceeds to S108.

In S108, the controller 220B executes a power consumption status determining process in which determination is made by the controller 220B as to whether the load has been changed. Description about the change of load will be made later. When determination is made that the load has been changed (S108: YES), the routine proceeds to S109. Otherwise (S108: NO), the routine proceeds to S105. In S109, the controller 220B executes a load coefficient setting process. More specifically, when determination is made so that the load has been changed in S108, the controller 220B updates the first coefficient K1. Then, the routine proceeds to S105.

In S110, the controller 220B outputs the resumption signal to the primary-side controller 132 to instruct resumption of the switching operation. Specifically, when determination is made so that the period of time from the present time to the first time is less than the delay time D in S107, the controller 220B issues a resumption instruction. In S111, the controller 220B is placed in a waiting condition to wait for elapse of delay time D.

In S112, the controller 220B resets the counter 223 for counting the number of occurrences of the clock signals. That is, the count value C is set to zero (0). In S113, the controller 220B sets the lower limit voltage V1 to an estimated voltage Ve.

In S114, the controller 220B acquires the count value in the counter 223, and then resets the counter 223. In S115, the controller 220B updates the estimated voltage Ve by adding a product of the second coefficient K2 and the count value C to the pre-estimated voltage Ve, i.e., Ve+K2*C. The second coefficient K2 represents an increased voltage of the output voltage Vo per unit time (clock interval) at the time of the switching operation. In S116, the controller 220B determines whether the updated estimated voltage is equal to or greater than the upper limit voltage V2. Specifically, the controller 220B determines whether the inequity relation of Ve>=V2 is met. When the above inequity relation is met (S116: YES), the routine ends. Otherwise (S116: NO), the routine proceeds to S114. That is, when the estimate value of the output voltage Vo is determined to be equal to or greater than the upper limit voltage V2, the controller 220B issues a stop instruction in S101, whereupon the routine ends.

Figure 6:
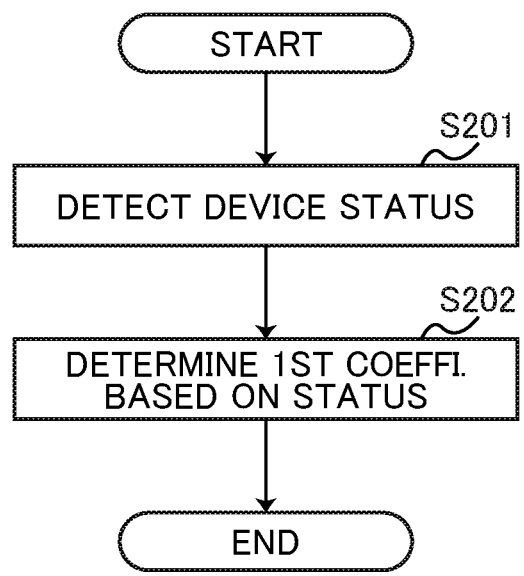
FIG. 6 is a flowchart illustrating a load coefficient setting process in accordance with the second embodiment.

FIG. 6 is a flowchart illustrating the load coefficient setting process. In step 201, the controller 220B detects the status of the device 10B. In S202, the controller 220B determines the first coefficient K1 on the basis of the detected status of the device 10B, whereupon the load coefficient setting process ends.

FIG. 7 is a table for describing how the first coefficient K1 is calculated. The table shows the operating statuses of the driven items, such as LAN port 21, WLAN port 22, MODEM 23, and the panel 24. The columns of the table excluding the leftmost one showing the driven items show operation patterns of each of the driven items. The lowermost cells of the table indicate the value of the first coefficient K1 under the designated operation statuses.

For example, the second column indicates that the WLAN port 22 is in operation and the LAN port 21, MODEM 23 and panel 24 are not being driven. P2 indicated in the bottom cell of the third column represents the gradient of the output voltage Vo at the time of stoppage of the switching operation. The sixth column of the table shows that both the WLAN port 22 and the MODEM 23 are in operation, and the LAN port 21 and panel 24 are not being driven. P6 indicated in the bottom cell of the sixth column represents the gradient of the lowering output voltage Vo at the time of stoppage of the switching operation. The value of P6 is greater than that of P2.

The memory 230 retains such a table for calculating the first coefficient K1. The controller 220B detects the status of the device 10B and determines the first coefficient K1 while referring to the table in which indicated is the first coefficient K1 calculated in advance as shown in FIG. 7. The change of load means possible patterns of driving of the driven items. State differently, the change of load means the change of the operational status of any of the driven items, resulting in the change of the selected column of the table.

Figure 8:
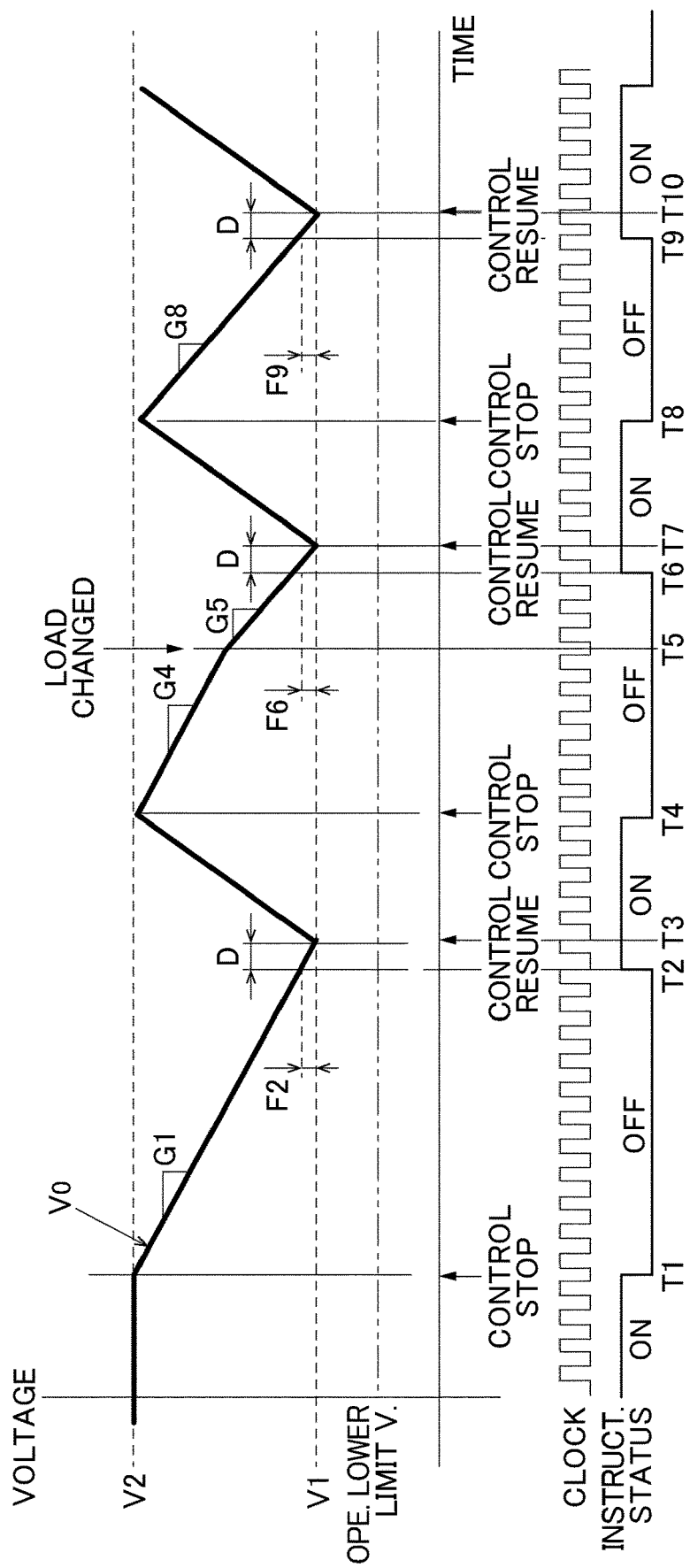
FIG. 8 is a timing chart illustrating operations of the device in accordance with the second embodiment.

FIG. 8 is a timing chart illustrating the output voltage Vo at the burst switching control operation implemented by the device 10B shown in FIG. 8. The timing chart of FIG. 8 further includes clock signals for measuring a period of time, and a state of instruction transmitted to the primary-side controller 132 by the controller 220B. What is meant by the state of instruction will be described below.

When the controller 220B transmits to the primary-side controller 132 an instruction to stop the switching operation, the status of instruction with respect to the switching operation is changed to "OFF" whereas when the controller 220B transmits to the primary-side controller 132 an instruction to resume the switching operation, the status of instruction with respect to the switching operation is changed to "ON". The state of instruction is indicated as being ON in the normal control operation.

At time instant T1 in the timing chart of FIG. 8, the normal control operation being implemented by the device 10B is changed the burst switching control operation (S3, S4). When the controller 220B instructs the primary-side controller 132 to stop the switching operation (S101), the switching operation is stopped as indicated "CONTROL STOP" in FIG. 8. At this moment, the state of instruction is changed from "ON" to "OFF". The controller 220B regards the upper limit voltage V2, which is also the target voltage Vt in the normal control operation as well, as the estimated voltage Ve at time instant T1 (S103).

After time instant T1, the output voltage Vo is gradually lowered from the upper limit voltage V2 attendant to the stoppage of the switching operation. The gradient G1 of the voltage lowering line segment is estimated as the first coefficient K1 with accuracy through the load coefficient setting process (S201, S202). As such, the estimated voltage at time instant T1 afterward is brought into coincidence with the output voltage Vo. During the stoppage of the switching operation, the controller 220B computes the time instant at which the output voltage Vo has reached the lower limit voltage V1, and this computed time instant is represented by T3 (first time instant). See the left side computation in the inequity shown in S107.

At time instant T2 at which the period of time up to time instant T3 has become equal to the delay time D (S107), the controller 220B instructs the primary-side controller 132 to resume the switching operation (S110). At time instant T2, the state of instruction is changed from "OFF" to "ON". However, the time at which the switching operation is actually resumed is time instant T3 delayed by the delay time D as indicated "CONTROL RESUMPTION" in FIG. 8. For this reason, the output voltage Vo continues lowering during a period of time from T2 to T3.

While the controller 220B regards the lower limit voltage V1 as being the estimated voltage V1 at time instant T3 (S113), this estimated voltage is in coincidence with the output voltage Vo as the gradient G1 of the lowering line segment of the output voltage Vo is accurately estimated. At the time after T3, the output voltage Vo increases resulting from the resumption of the switching operation. Because the gradient of the increasing line segment of the output voltage is also accurately defined as the second coefficient K2 meeting the conditions of switching operation performed at the time of burst switching control operation, the estimated voltage V1 at T2 afterwards is in coincidence with the output voltage Vo.

When the estimated voltage Ve has reached the upper limit voltage V2 at T4 (S116), the controller 220B instructs the primary-side controller 132 to stop the switching operation (S101) to result in the stoppage of the switching operation. At this time, the status of instruction changed from "ON" to "OFF".

During the period of time at which the state of instruction in the burst switching control operation is "OFF" indicating that the switching operation is not performed, power supplied to the circuit portions in the primary-side controller 132 required for implementing the switching control is interrupted or otherwise decreased. Consequently, the consumption power in the primary-side controller 132 can be remarkably lowered during the period of time when the switching operation is OFF. Further, because the change of the output voltage Vo during the burst switching control operation is accurately estimated as the estimated voltage Ve, there is no need for detecting the output voltage Vo during the burst switching control operation.

The prior art described in the aforementioned Japanese Patent Application Publication No. 2004-88959, it is required that the output voltage be continuously monitored by the voltage detecting circuit corresponding to the detection signal outputting portion 150 even during the burst switching control operation. In order to monitor the output voltage, the signal level determining circuit and the feedback circuit of the prior art that correspond to the monitoring circuit provided in the primary-side controller 132 for monitoring the detection signal Ss and the feedback circuit 133, respectively, need to be continuously monitored. In the device 10B, there is no need for operating such circuits. The power consumption during the burst switching control operation in accordance with the second embodiment can be effectively suppressed in comparison with the above-mentioned prior art.

On the other hand, in the device 10B, it is required that the controller 220B be operated during the burst switching control operation. The controller 220B is configured from an IC manufactured using a fine processing technology, such as ASIC, microprocessor, CPU, which are capable of operating with low power consumption. As such, increase of power consumption is only a little for operating the controller 220B for the purpose of estimating the output voltage Vo during the burst switching control operation. The enable signal Sb, which is used for feeding back information about the output voltage Vo to the primary side during the burst switching operation, may be produced only when the stop instruction or the resumption instruction is issued. The enable signal Sb is in a non-signal form over a major part of the operation time period, so that power is little consumed for transmitting the enable signal Sb. In addition, power is also little consumed in the enable signal transmitting circuit 134.

In the device 10B, the level of the lower limit voltage V1 that determines the timing to resume the switching operation during the burst switching control operation can be set independently of the circuit configuration of the detection signal outputting portion 150. Hence, the lower limit voltage V1 can be set to a level greatly lowered from the target voltage Vt, allowing to prolong the period of time at which the switching operation has been stopped. By doing so, the power consumption during the burst switching control operation can further be decreased.

The operation performed during the period of time from T8 to T10 is the same as the operation from T1 to T3. However, the consumption power in the driving portion 20B is not the same in the two periods of time mentioned above. The gradient G8 of the lowering output voltage Vo during the period of time from T8 to T10 is greater than the gradient G1 of the lowering output voltage Vo during the period of time from T1 to T3. Nonetheless, the lowering gradient G8 can be accurately estimated as the consumption-power dependent first coefficient K1 through the load coefficient setting process (S201, S202). The delay time D remains unchanged, which is a period of time from the time when the driving portion 20B instructs resumption to the time when the switching operation is actually resumed.

However, the voltage drop F9 of the output voltage Vo during the delay time from T9 to T10 is greater than the voltage drop F2 during the delay time D from T2 to T3. In other words, the controller 220B transmits the instruction to resume the switching operation at different timings where the output voltage Vo is at different levels in the voltage lowering periods of time from T1 to T3 and from T8 to T10 (S110). Consequently, even if the gradients of the voltage lowering line segments of the output voltage Vo during the stoppage of the switching operation were different, the switching operation is resumed whenever the output voltage Vo is lowered to the lower limit voltage V1.

The prior art disclosed in Japanese Patent Application Publication No. 2004-88959 does not take the delay time into consideration. The timing at which the switching operation is stopped is determined relying upon whether the output voltage has reached a threshold value while monitoring the output voltage during the burst switching operation. The prior art is not configured to instruct the stoppage of the switching operation at different timings at which the levels of the output voltage are different due to the different voltage lowering gradients of the output voltage Vo. As such, the prior art is not always capable of implementing the control for resuming the switching operation at the timing when the output voltage has reached the lower limit voltage during the burst switching control operation.

In the prior art, in order to prevent the output voltage from further lowering from the operation lower limit voltage, it was necessary to set the threshold value to a higher level. With such a setting, for almost all the cases, the switching operation resumes at a timing when the output voltage is higher than the lower limit voltage in the burst switching control operation which voltages corresponds to the lower limit voltage V1. This results in shortage of the period of time when the switching operation is being stopped, and so the power consumption effect achieved by the burst switching operation cannot be sufficiently attained.

On the other hand, the device 10B in accordance with the second embodiment is configured to operate in such a manner that the switching operation is resumed at the time when the output voltage Vo has reached the lower limit voltage V1, so that the period of time at which the switching operation is being stopped is reserved at a maximum and thus the power consumption suppressing effect can be attained at maximum.

The switching operation stopping period from T4 to T7 as shown in FIG. 8, the gradient G4 of the output voltage lowering line segment changes to a larger gradient G5. This is due to the fact that the change of the load has occurred at T5, causing to increase the consumption power. In such cases, the device 10B implements the power consumption status determining process during the switching operation stopping period of time, in which the change in the load is being monitored (S108) and the gradient of voltage lowering is immediately estimated again. Specifically, the first coefficient K1 is updated (S109), whereupon the timing T7 at which the output voltage has reached the lower limit voltage V1 (second time instant) is computed using the left side of inequity in S107.

In the device 10B, in the event that the change in the consumption power occurs during the burst switching control operation, the output voltage Vo can be accurately estimated following the change in the consumption power. As such, the period of time at which the switching operation is being stopped can be reserved at maximum at all times, and thus the power consumption suppressing effect can be attained at maximum.

Third Embodiment

The third embodiment will be described hereinafter. For the sake of simplicity, like circuits or portions appearing in the first and second embodiments will be designated by like reference numerals and duplicate description thereof is omitted. The device in accordance with the third embodiment implements a packet process reservation process in addition to the operations performed by the device 10B in accordance with the second embodiment. The LAN port 21 is an example of a communication circuit. The WLAN port 22 is also another example of the communication circuit. The following description will be made with respect to the case in which the WLAN 22 is adopted as the communication circuit.

FIG. 9 is a flowchart illustrating the packet process reserving process. In the third embodiment, the device 10B repeatedly implements the packet process reserving processes in S301 to S306 during the burst switching control operation.

In S301, the controller 220B determines whether the switching operation is being stopped. When it is determined that the switching operation is being stopped (S301: YES), the routine proceeds to S302. Otherwise (S301: NO), the routine process to S304. In S302, the controller 220B determines whether a packet has reached the WLAN port 22. When it is determined that the packet has reached (S302: YES), the routine proceeds to S303. Otherwise (S302: NO), the routine proceeds to S301. It should be noted that the packet as referred to herein means a communication packet received at the device 10B from an external device through the WLAN 22 (S302). In S303, the controller 220B increments the process reserving packet number by one (1) and the packet process is reserved or remain unattended. That is, when the switching operation is being stopped, the controller 220B reserves the packet processes.

In S304, the controller 220B determines whether the process reserving packet number is greater than zero (0). When it is determined that the process reserving packet number is greater than zero (S304: YES), the routine proceeds to S305. Otherwise (S304: NO), the flow ends herein. In S305, the controller 220B implements the process for the reserved packets. When the switching operation is being performed, the controller 220B implements the processes for the reserved packets. In S6, the controller 220B decrements the process reserved packet number by one (1), whereupon the routine proceeds to S304.

According to the third embodiment, during the burst switching control operation, the device 10B reserves the packet processes during the stoppage of the switching operation and implements the packet process with respect to each of the reserved packets during the switching operation. This can reduce the power consumption in the driving portion 20B during the stoppage of the switching operation and the period of time during the switching operation is being stopped can be prolonged. This can further reduce the power consumption in the device 10B during the burst switching control operation.

A packet reservation may not be performed but a response may be sent immediately without reservation with respect to a packet (such as ping response for the network) that can be processed without increasing the power consumption.

While the description has been made in detail with reference to the embodiments, it would be apparent to those skilled in the art that many modifications and variations may be made thereto.

What is claimed is:

1. A device comprising:
    a driving portion;
    a transformer having a primary winding and a secondary winding, the secondary winding generating an output voltage, the driving portion being connected across the secondary winding so that the output voltage is applied to the driving portion;
    a switching element connected in series to the primary winding;
    a first controller provided in a primary side of the transformer for controlling the switching element;
    a second controller supplied with the output voltage and configured to perform, during implementation of a burst switching control
        transmitting a stop signal to the first controller when the output voltage exceeds a first voltage, and
        transmitting, after transmission of the stop signal, a resumption signal to the first controller when the output voltage falls below a second voltage lower than the first voltage; and
    a detection signal output section for detecting whether the output voltage is larger than a predetermined voltage and outputting a detection signal indicating that the output voltage is larger than the predetermined voltage,
    wherein the first controller controls the switching element to stop performing switching operations in response to the stop signal, and further controls the switching element to resume performing the switching operations in response to the resumption signal,
    wherein the first controller controls the switching element to perform the switching operations in response to the detection signal,
    wherein the second controller comprises a voltage detecting portion configured to detect the output voltage,
    wherein when the voltage detected by the voltage detecting portion exceeds the first voltage, the stop signal is transmitted to the first controller, and thereafter when the voltage detected by the voltage detecting portion falls below the second voltage, the resumption signal is transmitted to the first controller, and
    wherein the first controller is configured to stop receiving the detection signal and switching operations of the switching element in response to the stop signal, and thereafter the first controller resumes the switching operations of the switching element in response to the resumption signal.

2. The device according to claim 1, wherein the detection signal output section comprises a light emitting element that emits light when the output voltage is larger than the predetermined voltage, and light receiving element configured to receive the light emitted from the light emitting device and outputting an electrical signal to the first controller, and
    wherein the first voltage is smaller than the predetermined voltage.

3. The device according to claim 1, further comprising an overcurrent protection circuit connected to the secondary winding, wherein the overcurrent protection circuit is configured to operate with the output voltage applied thereto as an operating voltage, and
    wherein the first voltage is set to a level lower than a lower limit value of the operating voltage.

4. The device according to claim 3, wherein the first controller is operated with a driving voltage supplied from the primary winding of the transformer, and wherein during a period of time at which to the detection of the detection signal is stopped in response to the stop signal and the switching control of the switching element is stopped in response to the stop signal, the first controller is supplied with the operating voltage having a level large enough to receive the resumption signal.

5. A device comprising:
    a driving portion;
    a transformer having a primary winding and a secondary winding, the secondary winding generating an output voltage, the driving portion being connected across the secondary winding so that the output voltage is applied to the driving portion;
    a switching element connected in series to the primary winding;
    a first controller provided in a primary side of the transformer for controlling the switching element; and
    a second controller supplied with the output voltage and configured to perform, during implementation of a burst switching control
        transmitting a stop signal to the first controller when the output voltage exceeds a first voltage, and
        transmitting, after transmission of the stop signal, a resumption signal to the first controller when the output voltage falls below a second voltage lower than the first voltage,
    wherein the first controller controls the switching element to stop performing switching operations in response to the stop signal, and further controls the switching element to resume performing the switching operations in response to the resumption signal, wherein in a condition where the switching operation is being stopped, a period of time from receipt of the resumption signal at the first controller to a time when the switching operation is resumed is set in advance as a delay time, wherein during the burst switching control, in which the stoppage and resumption of the switching operations are repeatedly carried out and during the stoppage of the switching operations, a first time instant, at which the output voltage has reached a lower limit voltage after the switching operations are stopped, is determined based on a gradient of lowering output voltage estimated on a basis of power consuming status in the driving portion, and wherein the resumption signal is transmitted to the first controller at a time instant ahead of the first time instant by the delay time.

6. The device according to claim 5, wherein the second controller is configured to perform:

a power consumption status determining process in which determination is made as to whether power consumption in the driving portion has been changed after determination of the gradient;

after a time at which determination is made so that power consumption in the driving portion has been changed in the power consumption status determining process, determining second time instant at which the output voltage has reached the lower limit voltage based on the gradient of lowering output voltage estimated on the basis of power consuming status in the driving portion; and transmitting the resumption signal to the first controller ahead of the second time instant by the delay time.

7. The device according to claim 6, wherein the driving portion comprises a plurality of driving portions, wherein the device further comprises a memory storing a gradient value corresponding to a driving status of each of the plurality of driving portions, and wherein the second controller is configured to determine a gradient value among the plurality of gradient values stored in the memory based on the power consumption status of the driving portion.

8. The device according to claim 5, wherein the first controller is operated with power required only for receiving the resumption signal under a condition that the switching control is being stopped.

9. The device according to claim 5, wherein the lower limit voltage is higher than a voltage required for operating the second controller.

10. The device according to claim 5, wherein the driving portion comprises a communication portion configured to receive a communication packet from an external device, and wherein the second controller is configured to reserve processing of the communication packet when the communication portion receives the communication packet during the stoppage of the switching control.

* * * * *